United States Patent
Magnaudeix et al.

(10) Patent No.: US 10,166,708 B2
(45) Date of Patent: Jan. 1, 2019

(54) METHOD FOR DEMOULDING A COMPOSITE MATERIAL WITH AN ORGANIC MATRIX

(71) Applicant: SAFRAN AIRCRAFT ENGINES, Paris (FR)

(72) Inventors: Dominique Michel Serge Magnaudeix, Moissy-Cramayel (FR); Raoul Jaussaud, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 82 days.

(21) Appl. No.: 15/517,397

(22) PCT Filed: Sep. 30, 2015

(86) PCT No.: PCT/FR2015/052608
§ 371 (c)(1),
(2) Date: Apr. 6, 2017

(87) PCT Pub. No.: WO2016/055717
PCT Pub. Date: Apr. 14, 2016

(65) Prior Publication Data
US 2017/0297241 A1     Oct. 19, 2017

(30) Foreign Application Priority Data

Oct. 7, 2014 (FR) ...................................... 14 59598

(51) Int. Cl.
*B29C 45/40* (2006.01)
*B29C 33/48* (2006.01)
(Continued)

(52) U.S. Cl.
CPC .......... *B29C 45/4005* (2013.01); *B29C 33/48* (2013.01); *B29C 45/14008* (2013.01);
(Continued)

(58) Field of Classification Search
CPC ..... B29C 45/40; B29C 45/4005; B29C 33/48; B29C 33/485; B29C 70/48;
(Continued)

(56) References Cited

U.S. PATENT DOCUMENTS 8,322,971 B2    12/2012   Coupe et al.
2012/0112377 A1*  5/2012  Bennett ................. B29C 33/485
                                                             264/101

FOREIGN PATENT DOCUMENTS

DE      38 20 084 A1    12/1989
EP      2 181 823 A1     5/2010
(Continued)

OTHER PUBLICATIONS

International Preliminary Report on Patentability and the Written Opinion of the International Searching Authority as issued in International Patent Application No. PCT/FR2015/052608, dated Apr. 11, 2017.

(Continued)

*Primary Examiner* — Robert B Davis
(74) *Attorney, Agent, or Firm* — Pillsbury Winthrop Shaw Pittman LLP

(57) ABSTRACT

An injection tooling is configured to inject a polymer resin into a fiber preform for fabricating a part in the form of a body of revolution out of composite material, the part having an internal cavity with back-draft. In order to enable the part to be unmolded after the polymer resin has been injected and polymerized, the tooling includes, arranged at least in the internal cavity, firstly a sectorized ring made up of at least three mutually touching inserts including one forming a keystone, the ring having an outside surface that matches the internal cavity with back-draft and an inside surface that presents natural draft, and secondly a conical drum secured to the inside surface of the sectorized ring to support it and that is withdrawn, once separated from the sectorized ring, (Continued)

relying on the natural draft created by the inside surface of the sectorized ring.

10 Claims, 4 Drawing Sheets

(51) Int. Cl.
  *B29C 70/48* (2006.01)
  *B29C 45/14* (2006.01)
  *F01D 25/24* (2006.01)
  *F04D 29/52* (2006.01)
  *B29L 31/00* (2006.01)
  *B29L 31/30* (2006.01)
(52) U.S. Cl.
  CPC ........ *B29C 45/14065* (2013.01); *B29C 70/48* (2013.01); *F01D 25/24* (2013.01); *F04D 29/526* (2013.01); *B29C 45/40* (2013.01); *B29C 2045/4036* (2013.01); *B29L 2031/3076* (2013.01); *B29L 2031/7504* (2013.01); *F05D 2240/14* (2013.01)

(58) Field of Classification Search
  CPC ..... B29C 2045/4036; B29L 2031/3076; B29L 2031/7504
  USPC ........................................................ 425/438
  See application file for complete search history.

(56) References Cited

FOREIGN PATENT DOCUMENTS

| | | | | |
|---|---|---|---|---|
| JP | 59159322 A | * | 9/1984 | ........... B29C 33/485 |
| WO | WO 2013/114051 A1 | | 8/2013 | |
| WO | WO-2013186477 A1 | * | 12/2013 | ............. B29C 70/44 |
| WO | WO-2015028736 A1 | * | 3/2015 | ........... B29C 70/446 |

OTHER PUBLICATIONS

International Search Report as issued in International Patent Application No. PCT/FR2015/052608, dated Feb. 5, 2016,.

\* cited by examiner

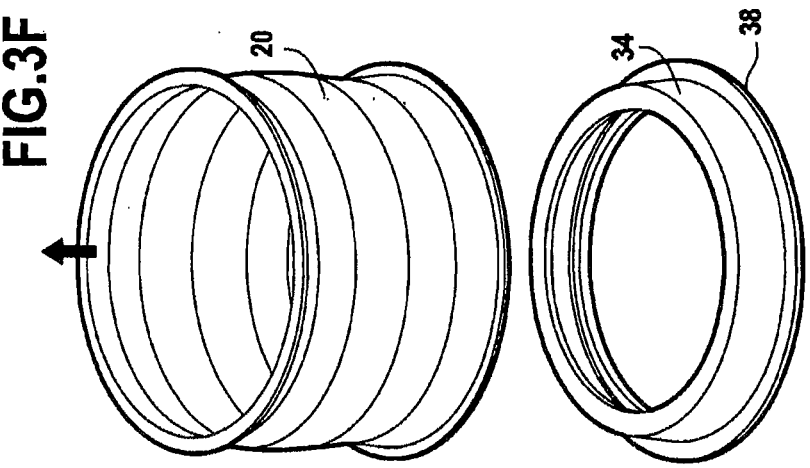
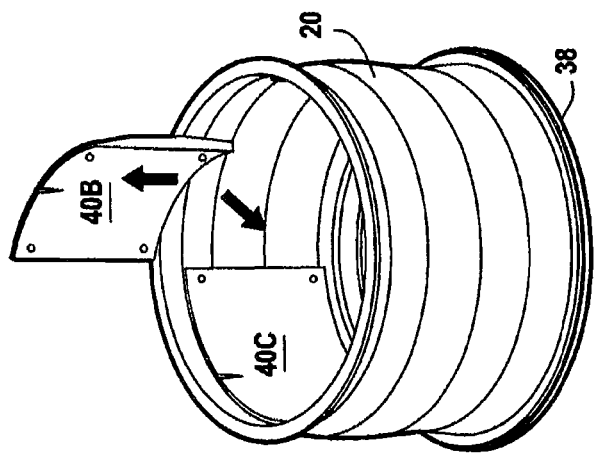
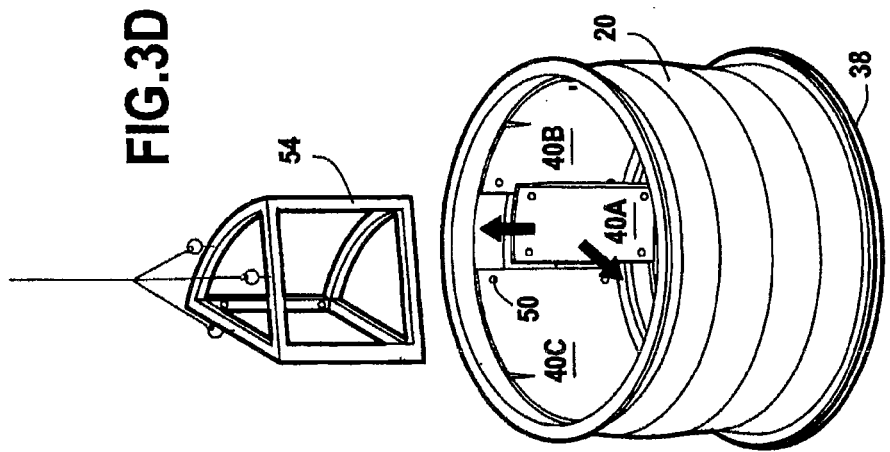

METHOD FOR DEMOULDING A COMPOSITE MATERIAL WITH AN ORGANIC MATRIX

CROSS REFERENCE TO RELATED APPLICATIONS

This application is the U.S. National Stage of PCT/FR2015/052608 filed Sep. 30, 2015, which in turn claims priority to French Application No. 1459598, filed Oct. 7, 2014. The contents of both applications are incorporated herein by reference in their entirety.

BACKGROUND OF THE INVENTION

The present invention relates to the field of composite materials comprising a polymer matrix reinforced by a fiber structure, and more particularly to the use of such materials in the fabrication of aviation parts or of turbine engines.

In the field of aviation, it is desired to reduce the weight of engine components while maintaining their mechanical properties at a high level. More particularly, in an aeroengine, the fan casing, which defines the outline of the air inlet passage into the engine and inside which there is received the rotor supporting the blades of the fan, is nowadays made out of composite material. In the form of a body of revolution, it comprises a shroud provided at its upstream and downstream ends with outwardly-directed flanges for fastening to other structural portions of the engine, such as the air inlet profile upstream, and the intermediate casing downstream. The casing also supports various components, and it must be capable of retaining the debris that results from a fan blade breaking or from items being ingested at the inlet of the engine.

Fabricating a fan casing out of composite material begins by putting a winding of fiber reinforcement into place on a mandrel having a profile that matches the profile of the casing that is to be made. By way of example, the fiber reinforcement may be made by three-dimensional or multilayer weaving, as described in patent U.S. Pat. No. 8,322,971. This fiber reinforcement constitutes a tubular fiber preform that is made integrally with margins corresponding to the flanges of the casing. Fabrication continues with the fiber preform being densified by a polymer matrix, where this consists in impregnating the preform with a resin and polymerizing the resin in order to obtain the final part.

The invention relates more particularly to fabrication in which the fiber preform is impregnated by the resin transfer molding (RTM) injection molding method. In this method, the fiber preform is enclosed by compacting it in a rigid mold of unchanging shape that has an inner half forming a support for the fiber preform and an outer half that is placed on the fiber preform and that is of shape that corresponds to the shape of the casing that is to be obtained, after which resin is injected under pressure and at controlled temperature into the inside of the mold after the walls of the two mold halves have been brought together, and possibly after the mold has been evacuated. Once the resin has been injected, it is polymerized by heating the mold, and after injection and polymerization, the final part is unmolded and then trimmed in order to avoid excess resin, and chamfers are machined in order to obtain the desired casing.

In order to facilitate such unmolding, the injection tooling needs to be completely leaktight, and in general it is constituted by a mold comprising: two adjacent inside drums reproducing the passage for air; upstream and downstream cheek plates for forming the two rims of the casings; and an outer half made up from a plurality of outer sectors. These sectors and the upstream and downstream cheek plates are removed outwards. The two inner drums are uncoupled and then removed from each side of the casing relying on the natural drafts of the air passage.

Unfortunately, in certain casing configurations, the passage for air narrows at the upstream end of the casing, with the passage varying, for example, between an upstream first diameter to a second diameter that is larger in a central zone, and once more to a smaller third diameter further downstream, which means that the final part cannot be unmolded because of the impossibility of withdrawing the upstream drum. The difference between the small and the large diameters may for example lie in the range 40 millimeters (mm) to 80 mm for a casing having a mean diameter that may be about 1500 mm to 3500 mm.

OBJECT AND SUMMARY OF THE INVENTION

An object of the invention is thus to provide injection tooling for fabricating a gas turbine casing out of composite material that presents an internal cavity with back-draft and that enables the unmolding to be performed easily, in particular without significantly increasing the steps involved or the weight of the mold.

This object is achieved by injection tooling for injecting a polymer resin into a fiber preform for fabricating a part in the form of a body of revolution out of composite material, the part having an internal cavity with back-draft, the tooling being characterized in that in order to enable said part to be unmolded after said polymer resin has been injected and polymerized, the tooling includes, arranged at least in said internal cavity, firstly a sectorized ring made up of at least three mutually touching inserts including one forming a "keystone", the ring having an outside surface that matches said internal cavity with back-draft and an inside surface that presents natural draft, and secondly a conical drum that is secured to said inside surface of said sectorized ring to support it and that is withdrawn, once separated from said sectorized ring, relying on said natural draft created by said inside surface of said sectorized ring.

Thus, it is possible to unmold bodies of revolution presenting an internal cavity with back-draft merely by adding a sectorized additional part having a "keystone" to the mold support that is thus made to be unmoldable.

In a preferred embodiment, said sectorized ring comprises at least three inserts, said keystone-forming insert occupying an angle lying in the range 20° to 40°, and more particularly said sectorized ring comprises four inserts, three inserts, each occupying an angle of 110°, and a keystone-forming fourth insert occupying the remaining angle of 30°.

Preferably, said inserts are secured to said upstream drum by screw-fastening, and they include handling members to enable them to be extracted by a hoist or any analogous lifting system.

In order to center said insert angularly relative to said conical drum, mutual centering elements are advantageously arranged facing one another respectively on said insert and on said conical drum, and in order to center said inserts angularly relative to said conical drum, annular slopes are arranged at one of the ends of said inserts.

Advantageously, said inserts are made of a metal material having mechanical properties and dimensional stability that facilitate expansion during polymerization by heating, or said inserts are made of metal sheet including weight-reducing blind holes between stiffeners on the face that is to come into contact with said upstream drum.

BRIEF DESCRIPTION OF THE DRAWINGS

Other characteristics and advantages of the invention appear from the following description of particular embodiments of the invention, given as non-limiting examples and with reference to the accompanying drawings, in which:

FIGS. 3A to 3F show the successive steps performed in the FIG. 2 injection tooling for unmolding the FIG. 1 fan casing.

DETAILED DESCRIPTION OF EMBODIMENTS

The invention applies in general manner to any gas turbine part made of polymer matrix composite material. Nevertheless, the invention is described below in the context of its application to a fan casing for a gas turbine aeroengine.

Figure 1:
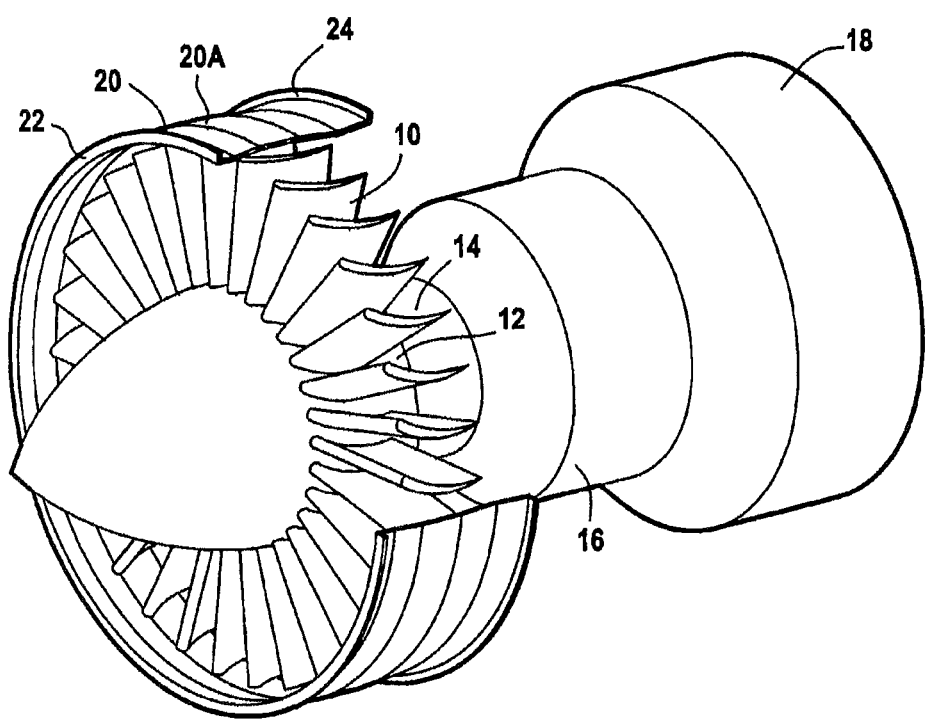
FIG. 1 is a perspective view of an aeroengine having a fan casing obtained using injection tooling in accordance with the invention.

FIG. 1 is a diagram showing such a gas turbine aeroengine comprising, from upstream to downstream in the flow direction of the gas stream: a fan 10 arranged at the inlet of the engine; a compressor 12; a combustion chamber 14; a high pressure turbine 16; and a low pressure turbine 18. The engine has successive casings corresponding to various elements of the engine and of inside surface defining the air inlet passage of the engine. Thus, the fan 10 is surrounded by a fan casing 20 in the form of a body of revolution and made out of fiber reinforcement, e.g. using carbon, glass, aramid, or ceramic fibers, densified by a polymer matrix, e.g. an epoxy, bismaleimide, or polyimide matrix. The fiber reinforcement is obtained in known manner by three-dimensional or multilayer weaving, e.g. by weaving an "interlock" weave, and the matrix is obtained by a liquid technique using known injection methods such as the RTM molding method.

The fan casing 20 has outwardly-directed flanges 22 and 24 at its upstream and downstream ends in order to enable it to be mounted and connected to other elements of the engine. Between its upstream and downstream ends, the fan casing has an intermediate portion (internal cavity 20A presenting back-draft) that has a diameter that is greater than the diameters of the end portions connecting progressively therewith, which intermediate portion makes it impossible to have recourse to standard RTM injection tooling.

In the invention, it is thus proposed to resolve the problem posed by unmolding a body of revolution having an internal cavity with back-draft by adding an additional piece to the upstream drum supporting the part being molded on either side of this cavity so as to enable that part to be unmolded from the upstream end of the casing, which additional piece is added between the fiber preform that receives the injection and the upstream drum, thereby recreating natural draft that makes unmolding possible once more.

Figure 2:
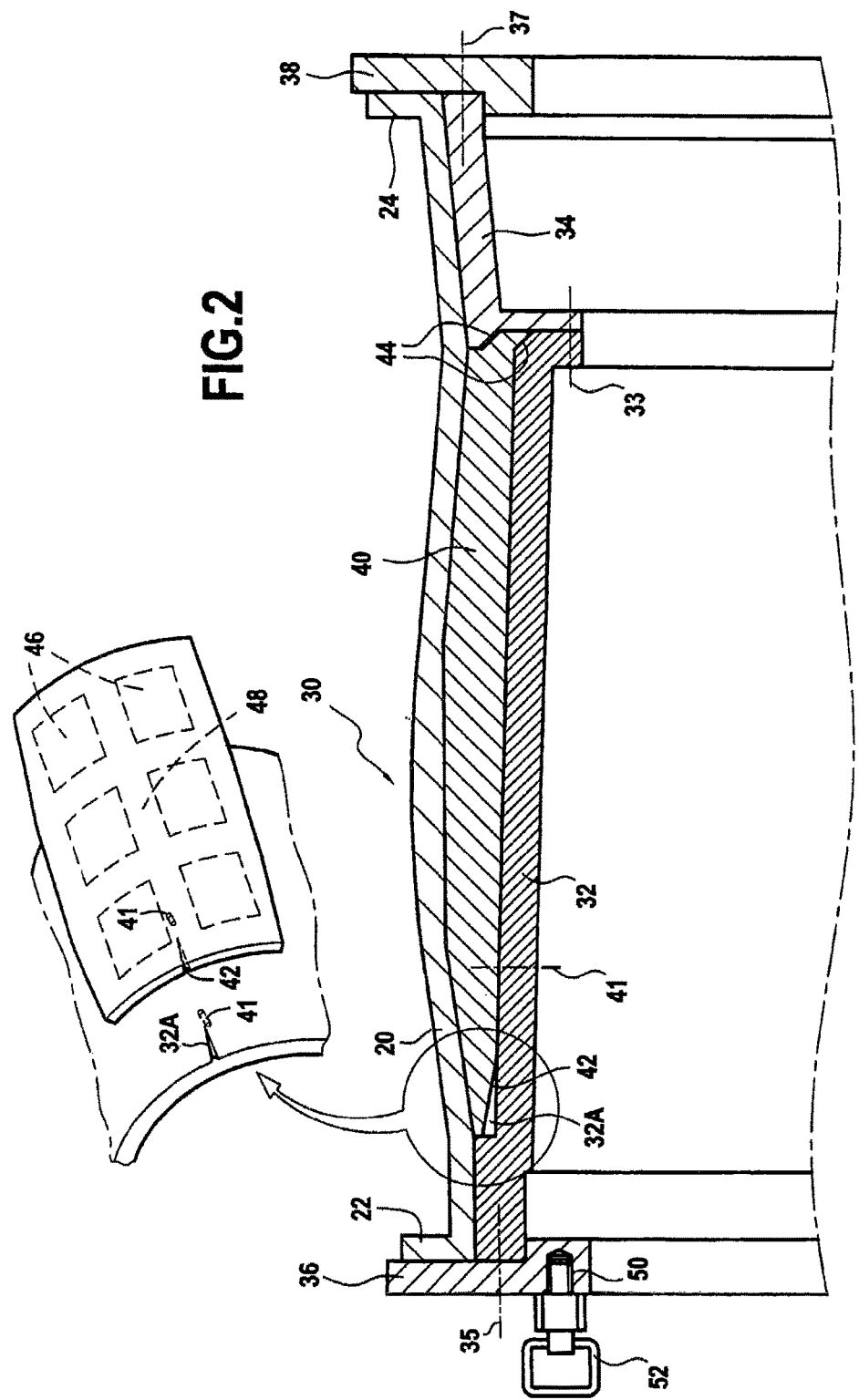
FIG. 2 is a half-view in axial section of the injection tooling enabling the FIG. 1 fan casing to be fabricated.

FIG. 2 is a section of the injection tooling of the invention supporting the fan casing 20 and omitting the sectorized outer half on the outside that conventionally closes the mold.

More precisely, in known manner, the tooling 30 comprises an upstream drum 32 and a downstream drum 34 together with an upstream cheek plate 36 and a downstream cheek plate 38. The upstream and downstream drums touch each other via a reentrant diameter (in general the smallest diameter of the air passage) so as to make unmolding possible relying on the natural draft of the passage on either side of this junction, and they are secured to each other at the junction by connection means such as bolts (see axis lines given reference 33). The upstream and downstream cheek plates for molding the outwardly-directed flanges 22 and 24 are also secured to the upstream and downstream drums respectively, e.g. by screw-fastening (see axis lines given references 35 and 37). It should be observed that the upstream cheek plate and the upstream drum may comprise a single piece, and the same applies to the downstream cheek plate and the downstream drum.

In accordance with the invention, this tooling further includes an additional piece made up of a sectorized ring 40 having at least three touching inserts and typically four such inserts 40A-40D, e.g. screw-fastened (see axis lines given reference 41) to the upstream drum 32 supporting the fiber preform in the internal cavity with back-draft and on either side thereof, and having a slightly conical shape in order to facilitate unmolding in the upstream direction. Preferably, the screw-fastening is located as close as possible to the free end of the upstream drum 32 in order to facilitate access thereto when the drum is to be removed. In addition, in order to ensure that the inserts 40 are angularly centered on the upstream drum 32 and the downstream drum 34, mutual centering elements 32A and 42 are advantageously arranged on each of these pieces.

More precisely, the sectorized ring of outside surface matching the internal cavity with back-draft (and its upstream and downstream approaches) presents an inside surface with natural draft (i.e. an angle of inclination of a few degrees sufficient to make unmolding possible in the manner that applies to a prior art air passage). Annular slopes 44 are provided at one of its ends in order to provide annular (axial and radial) centering both on the upstream drum 32 and on the downstream drum 34. The ring is made of a metal material having mechanical properties and dimensional stability that facilitate managing expansion during polymerization by heating, e.g. steel sheets of thickness that lies in the range 50 millimeters (mm) to 80 mm, for example, and including blind holes 46 for weight-reducing purposes between stiffeners 48 on the face that comes into contact with the upstream drum. The drums and the inserts are preferably made of the same material.

In order to enable them to be removed, when the sectorized ring is made of up four inserts, three of these inserts are designed to cover respective angles of 110°, while the fourth insert covers the remaining angle of 30° and forms a kind of "keystone" for the additional part. Nevertheless, depending on the total number of inserts (which may lie in the range three to five, for example), and depending on their dimensions, the "keystone" fourth insert may cover an angle possibly lying in the range 20° to 40°. The inserts need to be a good fit with the upstream drum since the resin is injected under pressure after generating a vacuum inside the mold. The mechanical properties and the dimensional stability of the material constituting the ring facilitate successful injection. Naturally, conventional gaskets (not shown) also need to be provided between the various pieces of the mold in order to guarantee that it is indeed leaktight.

During the molding stage, the injection process is no different from the conventional RTM injection process, with the fiber preform being placed inside the mold that is closed in leaktight manner. Thereafter, low viscosity liquid thermosetting resin is injected into the mold in order to impregnate the entire fiber portion of the preform. Polymerization is then performed, generally by heating the mold in one or more consecutive cycles in order to achieve the desired degree of densification. Once injection and polymerization have been completed, the part as finally obtained can then be unmolded using steps that are now different from the steps performed in the conventional process, because of the way the tooling is modified.

Figure 3C:
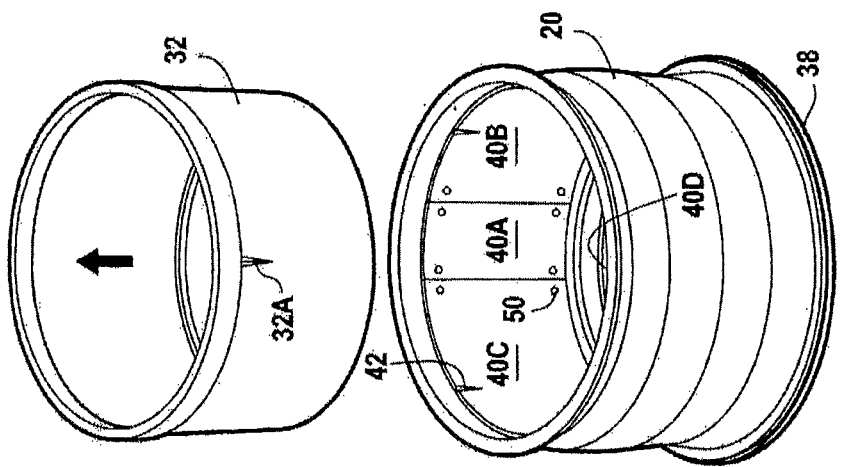
Figure 3B:
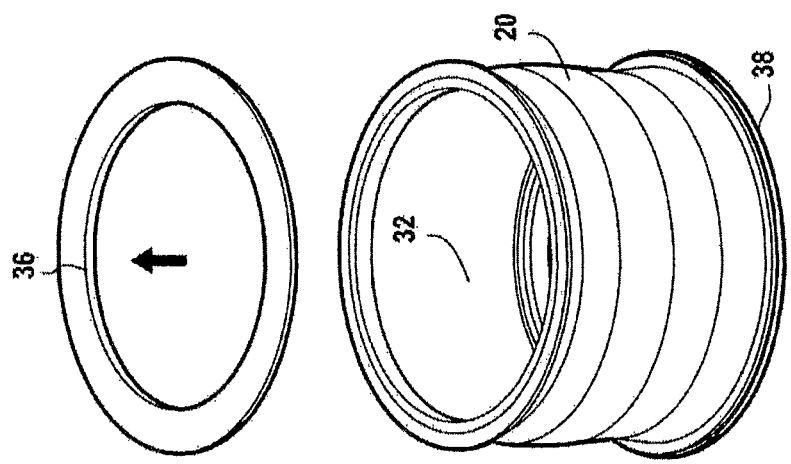
Figure 3A:
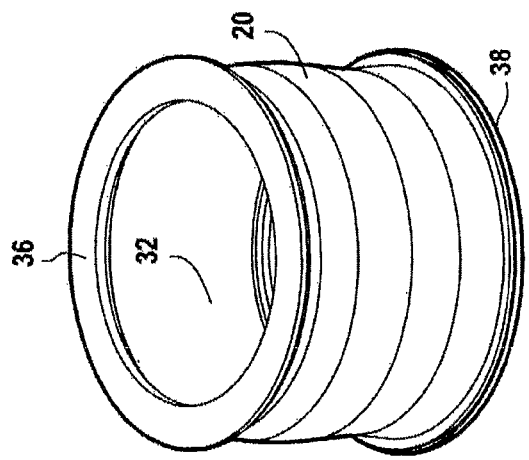

The unmolding steps are shown sequentially in FIGS. 3A to 3F. FIG. 3A shows the mold at the end of the polymerization step, the outer half having been removed in a first unmolding step and the outside surface of the final part thus has the outside shape of the casing that is to be made. The second step shown in FIG. 3B consists in unscrewing the fasteners 35 and removing the upstream cheek plate 36 so as to release the upstream drum 32 which, once separated from the upstream drum 34 by unscrewing the fasteners 33, can then itself be withdrawn in a following step shown in FIG. 3C (naturally, the fasteners 41 of the inserts are removed beforehand). Withdrawal of the upstream drum 32 and withdrawal of the downstream drum 34 can then take place simultaneously, instead of being performed one after the other.

This withdrawal of the upstream drum 32 makes it possible to release the inserts 40A-40D that can be removed, beginning with the "keystone" insert 40A (new step shown in FIG. 3D) prior to removing the remaining other inserts 40B-40D, as shown in FIG. 3E. Finally, in a last step shown in FIG. 3F, the final part can at least be extracted in turn from the mold, of which there then remains only the downstream drum 34 and the downstream cheek plate 38. This final part is then trimmed in order to remove excess resin and obtain the fan casing 20.

For all of these steps, given their dimensions (diameter of several meters) and their weights (several (metric) tonnes), all of these parts need to be handled with precaution, and they are therefore preferably withdrawn by means of a hoist or any other similar lifting system, each of the mold parts then including the members needed to enable to them to be moved. By way of example, these handling members may comprise fastener holes 50 that can have docking rings 52 (see FIG. 2) mounted on the heads of bolts screwed therein, or any other hole for connection purposes, e.g. with a handling frame 54 (see FIG. 3D) itself having docking rings that co-operate by engaging hooks associated with a hoist. In general manner, the technique for handling and fastening large parts by means of systems for handling loads that are heavy and/or bulky, by using docking rings screwed into said loads, is of known type.

It should be observed that in order to avoid any damage to the final part during the final withdrawal step, this step should preferably be performed by using a handling ring, a sling, or any other equivalent means for handling large bodies of revolution. The final casing part does not have any specific member for handling purposes, so this ensures it does not run any risk of being damaged during such handling.

The invention claimed is:

1. An injection tooling for injecting a polymer resin into a fiber preform for fabricating a part in the form of a body of revolution out of composite material, the part having an internal cavity with back-draft, wherein, in order to enable said part to be unmolded after said polymer resin has been injected and polymerized, the tooling includes, arranged at least in said internal cavity, firstly a sectorized ring made up of at least three mutually touching inserts including one forming a keystone, the sectorized ring having an outside surface that matches said internal cavity with back-draft and an inside surface that presents natural draft, and secondly a conical drum secured to said inside surface of said sectorized ring to support it and that is withdrawn, once separated from said sectorized ring, relying on said natural draft created by said inside surface of said sectorized ring.

2. The injection tooling according to claim 1, wherein said sectorized ring comprises at least three inserts, said keystone-forming insert occupying an angle lying in the range 20° to 40°.

3. The injection tooling according to claim 2, wherein said sectorized ring comprises four inserts, three inserts each occupying an angle of 110°, and a keystone-forming fourth insert occupying the remaining angle of 30°.

4. The injection tooling according to claim 1, wherein said inserts are secured to said conical drum by screw-fastening.

5. The injection tooling according to claim 1, wherein, in order to center said insert angularly relative to said conical drum, mutual centering elements are arranged facing one another respectively on said insert and on said conical drum.

6. The injection tooling according to claim 5, wherein, in order to center said inserts angularly relative to said conical drum, annular slopes are arranged at one of the ends of said inserts.

7. The injection tooling according to claim 1, wherein said inserts include handling members to enable them to be extracted by a hoist or any analogous lifting system.

8. The injection tooling according to claim 1, wherein said inserts are made of a metal material having mechanical properties and dimensional stability that facilitates expansion during polymerization by heating.

9. The injection tooling according to claim 1, wherein said inserts are made of metal sheet including weight-reducing blind holes between stiffeners on the face that is to come into contact with said conical drum.

10. The injection tooling according to claim 1, wherein said body of revolution made out of composite material is a fan casing.

* * * * *